United States Patent [19]

Beratan et al.

[11] Patent Number: 5,062,693
[45] Date of Patent: Nov. 5, 1991

[54] ALL-OPTICAL PHOTOCHROMIC SPATIAL LIGHT MODULATORS BASED ON PHOTOINDUCED ELECTRON TRANSFER IN RIGID MATRICES

[75] Inventors: David N. Beratan; Joseph W. Perry, both of South Pasadena, Calif.

[73] Assignee: The United States of America as represented by the Administrator of the National Aeronautics and Administration, Washington, D.C.

[21] Appl. No.: 480,385

[22] Filed: Feb. 15, 1990

[51] Int. Cl.$^5$ ............... G02B 5/23; G02B 1/01; G02B 1/12

[52] U.S. Cl. .................. 359/241; 359/240; 359/11

[58] Field of Search .............. 350/354, 353, 3.68

[56] References Cited

U.S. PATENT DOCUMENTS

| | | | |
|---|---|---|---|
| 3,711,180 | 1/1973 | Klinger et al. | 350/150 |
| 3,725,292 | 4/1973 | Gerhardt | 350/354 |
| 3,747,022 | 7/1973 | Nanamatsu et al. | 332/7.51 |
| 3,774,988 | 11/1973 | Rogers | 350/357 |
| 3,949,224 | 4/1976 | Klingen | 250/216 |
| 4,441,791 | 4/1984 | Hornbeck et al. | 350/360 |
| 4,550,982 | 11/1985 | Hirai | 350/357 |
| 4,622,174 | 11/1986 | McKoy et al. | 350/353 |
| 4,696,533 | 9/1987 | Kingston et al. | 350/96.14 |
| 4,741,602 | 5/1988 | Hara et al. | 350/356 |

Primary Examiner—Rolf Hille
Assistant Examiner—Robert P. Limanek
Attorney, Agent, or Firm—Thomas H. Jones; Harold W. Adams; John R. Manning

[57] ABSTRACT

A single material (not a multi-element structure) spatial light modulator (50) may be written to (30), as well as read out from (80), using light (20). The device has tailorable rise and hold times dependent on the composition and concentration of the molecular species used as the active components. The spatial resolution of this device is limited only by light diffraction as in volume holograms. The device may function as a two-dimensional mask (transmission or reflection) or as a three-dimensional volume holographic medium. This device, based on optically-induced electron transfer, is able to perform incoherent to coherent image conversion or wavelength conversion over a wide spectral range (ultraviolet, visible, or near-infrared regions).

20 Claims, 3 Drawing Sheets

ALL-OPTICAL PHOTOCHROMIC SPATIAL LIGHT MODULATORS BASED ON PHOTOINDUCED ELECTRON TRANSFER IN RIGID MATRICES

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to spatial light modulators (SLMs), and, more particularly, to SLMs employing electron transfer.

BACKGROUND ART

Spatial light modulators are devices for controlling the spatial distribution of the intensity of light (i.e., near-IR, visible, and UV). Such devices, which can be used in processing data, are capable of spatially modulating a collimated coherent or incoherent beam of light with, for example, input data which is to be processed. The devices are appropriately coupled to optical data processing systems into which the data-modulated light beam is supplied at a rate commensurate with the processing system's potential throughput; the optical processing system utilizes parallel processing without the limitations normally imposed by serial manipulation of the data.

Optical computing structures hold the promise of providing highly parallel, high speed computational architectures. Such structures will be capable of image recognition and processing tasks unapproachable with conventional computing. A major impediment to practical optical computers is the absence of suitable optical processing elements.

Many optical computational schemes rely on programmable optical masks or spatial light modulators.

Implementations of optical computers for "conventional" as well as "neural network" computing schemes are limited by the speed, pixel density, programmability, and cost of these SLMs.

Existing optically addressed spatial light modulators (SLMs) can be characterized as either multielement or single element systems. In the multielement systems, separate elements are required to act as photosensors and modulating materials. These systems tend to be complex, expensive, and slow. Existing single element materials can act as SLMs based on various principles. These include photoconductive electro-optic materials (such as bismuth silicon oxide, BSO), photorefractive materials (such as barium titanate or gallium arsenide), materials which undergo electroabsorption (Franz-Keldysh effect, such as gallium arsenide), or thermally sensitive materials (such as vanadium dioxide or smectic liquid crystals). Table I (adapted from A. D. Fisher and J. N. Lee, SPIE, Vol. 634, p. 352 (1986)) lists the device characteristics of several of these "state of the art" spatial light modulators (lp=line pairs).

TABLE I

Performance Characteristics of Existing Spatial Light Modulators

| Type | Typical Material | Resolution (lp/mm) | Switching energy ($\mu J/cm^2$) | Response time (msec) |
|---|---|---|---|---|
| Pockels | BSO | 10 | 5 | 0.1 |
| Volume Hologram | $BaTiO_3$ | 1500 | 1 to $10^4$ | <30 |
| Electro-absorption | GaAs | 16 × 1 pxls. | — | $<10^{-6}$ |
| Thermal | liq. cryst. | 40 | $10^4$ | $5 \times 10^{-3}$ |
| Multi-element | liq. cryst. | 30 | 6 | 1 to 10 |

Liquid rrystal SLMs, developed primarily for display applications, are relatively slow, low density devices. A great need exists for fast, high density programmable (write many times) SLMs for optical computing applications.

It is clear from this Table that the existing materials do not possess the desired combination of high resolution, low switching energy, and fast response.

STATEMENT OF THE INVENTION

Accordingly, it is an object of the present invention to provide a single element spatial light modulator which uses direct optical writing and readout, has high spatial resolution, has low switching energy and fast switching times, is easy to fabricate, and is of low cost.

Briefly, an all-optical, two-dimensional spatial light modulator adapted to switch transmissive properties for a certain amount of time at specific locations comprises:

(a) a multi-state intermolecular charge transfer system capable of switching between states;

(b) means for supplying input data to the charge transfer system; and (c) means for supplying an input electromagnetic wave through the charge transfer system to provide an output electromagnetic wave, the intensity of the output electromagnetic wave being spatially modulated by the input data.

A multi-state charge transfer system comprises a donor molecular moiety and an acceptor molecular moiety, which may be separated by one or more intermediate molecular moieties. Films can be made from a plurality of such change transfer systems, linked together,through molecular bonding. Or, charge transfer system (or charge transfer system linked together) may be dissolved or dispersed in a host material. The device is all-optical, and requires no hard connection or wiring to the processing system.

At a wavelength of 0.5 $\mu$m, the number of line pairs that can be written is 1000 lines/mm. The sensitivity of the device of the invention is estimated to be about 10 to 300 $\mu J/cm^2$, while rise time and hold time are about $10^{-12}$ to $10^{-6}$ sec and about $10^{-9}$ to $10^{-1}$ sec, respectively. These values compare favorably with those listed in Table I, above, and provide the desired combination of high resolution, low switching energy, and fast response, all in a single material.

DETAILED DESCRIPTION OF THE INVENTION

Figure 1A:
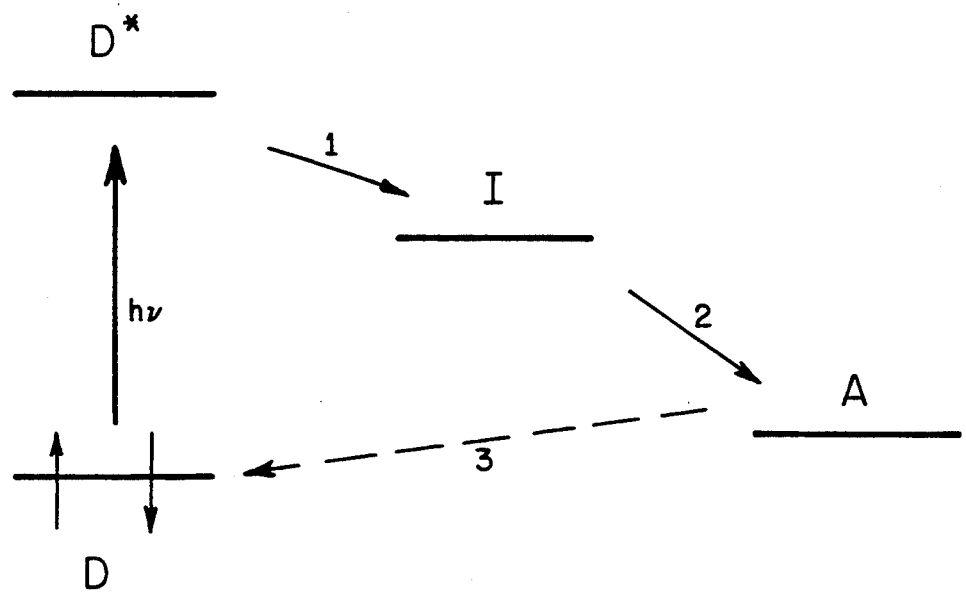
FIG. 1a is an energy level diagram, showing the simplest three species charge transport pathway.

Systems of molecular donors and acceptors randomly distributed in glassy polymer hosts have been shown to undergo photoinduced electron transfer. This electron transfer leads to significant changes in the optical transmission characteristics of the system. These changes can be exploited to modulate the transmission of a readout beam impinging on the polymer matrix. The image of the light used to induce the electron transfer will write a pattern of transmission change (a mask) onto the matrix. Thus, the system will act as a spatial light modulator. Because the charge transfer takes place on a molecular (<100 U) distance scale, the spatial resolution of the mask is intrinsically limited only by diffraction of light. Photoinduced electron transfer between molecules in such systems is known to occur on a subnanosecond time-scale; therefore, the masks can be written quickly. By exploiting the rich dynamics of multicomponent electron transfer systems, mask storage times from nanoseconds to milliseconds can be achieved. Polymeric spatial light modulators can be fabricated using simple, common, and inexpensive processing techniques and materials.

Rough estimates of the characteristics of an ideal device combine the best characteristics from the various types of existing devices listed above in Table I: 1500 lp/mm, sensitivity of 10 to 300 $\mu J/cm^2$, and response time of $<10^{-9}$ sec. Other significant features of the ideal device include: (1) no bias voltages are required, (2) it can function as a transmission or volume holographic SLM, (3) tailorability of hold (or storage) times, and (4) possibility of use in an optical bistable device ("nonlinear etalon").

In accordance with the invention, a multi-state intermolecular charge transfer system is employed to create a switched state, of tailorable rise time $\tau_r$ and tailorable decay time $\tau_d$, as a means of creating an optical mask in the SLM. The considerable gain over prior art materials results from the high density of pixels (e.g., 1000 lines/mm at $\lambda = 0.5$ $\mu m$) which can be written and the transient tailorable rise and decay times ($\tau_r = 10^{-12}$ to $10^{-6}$ sec; $\tau_d = 10^{-9}$ to $10^{-1}$ sec, respectively) of the mask. Use of the charge transfer system is expected to produce room temperature SLMs with nanosecond writing speeds and decay times tailorable over many decades (nanosecond to millisecond).

As used herein, "multi-state" refers to charge transfer systems employing at least two entities having different energy levels to allow transitions to occur from an excited state in one entity to a lower state in another entity. However, three-state systems provide better tailorability and control than two-state systems, and hence are preferred. While more than three such entities may be employed, present technology favors a three-entity system for such electron transitions.

Also as used herein, "charge transfer" (CT) is intended to include both classical charge transfer mechanisms (over a potential barrier) as well as tunneling mechanisms (through a potential barrier).

CT-SLM devices based on these materials may be employed in high speed parallel computational tasks related to image processing (e.g., edge enhancement, feature recognition), correlation, and recognition. They also have applications for novel optical computing strategies, including the optical implementation of neural network computing strategies.

Molecules which can undergo charge transfer reactions are ideally suited to be the switching elements in SLMs for the following reasons. (1) Charge transport reactions occur over a limited spatial range (typically 10 to 50 U) between chromophores doped into a polymer matrix. Therefore, the density of pixels which can be addressed is limited only by the diameters of the switching and probing light beams (on the order of the wavelength of light, $\lambda$). (2) The charge separation and recombination rates are tailorable over several orders of magnitude, making the masks useful for a variety of optical computing strategies. (3) The switched state (charge separated state) appears rapidly (picoseconds to microseconds). (4) The charge transport switching events involve no bond breakage or formation and, hence, are non-destructive. Thus, the masks can be written to with a frequency determined by the choice of donor and acceptor state lifetimes.

The merit of these CT-SLM devices compared to current "state of the art" SLMs can be estimated with the empirical rule $$\text{Merit} \propto P \frac{\tau_{CT}}{\tau_R} \frac{1}{E_s} \Delta OD \frac{1}{e}$$

where P is the pixel density, $\tau_{CT}$ is the lifetime of the charge separated state compared to its optimum lifetime, $\tau_R$ is the rise time of the switched state, $E_5$ is the energy 7 dissipated to create the switched state, $\Delta OD$ is the optical density change at the detection wavelength due to switching, and e is the switching error factor at a given pixel density due to state switching induced by the probe beam. The availability of convenient light sources at the switching and probing wavelengths should also be considered. Rough estimates of this measure of merit for CT-SLMs relative to current SLM technology indicate enhancements of several orders of magnitude. The dominant enhancement of the merit compared to liquid crystal devices, for example, is the rapid rise time and high pixel density.

A. Device Design Strategy

Charge transfer between localized states in ordered and disordered materials has been the subject of considerable study over the last 20 years. However, until recently, the dependence of the rate on the detailed electronic structure of the donor, acceptor, and intervening material has been only poorly understood. The dependencies of these rates on the molecular electronic structure of all species involved in the transport has been studied. What has become clear is that the rate of charge transport from donor to acceptor depends critically on those donor and acceptor states and their virtual mixing with the bridging states (orbitals). Also, any true bridge localized intermediate states must be considered explicitly when calculating rates. Hence, attempts to tune transport rates can take two approaches. One is to alter the "medium" between donor and acceptor or to introduce intermediate acceptors. The other is to alter the donor and acceptor electronic and vibronic structure itself.

Much insight into strategies for achieving efficient photoinduced charge separation comes from biological systems. These systems achieve charge separation with unit quantum efficiency and produce states with charge separated lifetimes long enough for the energy stored in the charge separated state to be used in a variety of chemical processes. One essential aspect of the biological systems seems to be in the two-step nature of the charge separation. A similar strategy may be adopted, using three-state systems rather than two-state systems. The basic problem is to understand in detail how the efficiency and tunability of the charge transfer reactions in such a three-state system can be affected by materials parameters.

Another important aspect of the biological systems is the spatial order of the chromophores. In the random systems discussed here, the benefits of ordered arrays of chromophores are temporarily forfeited. Still, the lessons from the natural systems may be used, lessons concerning the number and energetics of charge transport states, to achieving efficient charge separation in random systems. Ordering of the chromophores can be introduced by stretching the films, poling the films, or by covalently attaching the chromophores. The simplest practical devices which can be prepared are disordered systems. Such a disordered system would comprise the chosen donors and acceptors dissolved and randomly distributed in a host medium.

In one approach, each donor (D), intermediate (I), and acceptor (A) molecule is dispersed as such in a host. In a given random matrix, each molecule is surrounded by six to twelve nearest neighbors; the spacing is almost close-packed. Here, the concentration of the donor, intermediate, and acceptor molecules is different. The donor molecules have a characteristic quenching radius, and the concentration of intermediate molecules is such that there is at least one intermediate molecule within the radius of quenching. This radius will then define the minimum acceptor concentration. The minimum ratio of I/D is 1; the minimum ratio of A/I is 1.

In another approach, the donor, intermediate, and acceptor molecules are linked in some fashion, say D-I-A, to form a charge transfer system. Such molecular modules are then dispersed in a host material to achieve a high optical quality result, for example, a glassy polymer., In yet another approach, the charge transfer system may be linked to the backbone of the host polymer itself, either by linking the donor, acceptor, and intermediate molecules independently to the backbone or by linking one end of the charge transfer system to the polymer backbone. The separate molecules or molecular charge transfer system may be linked as pendant groups on the polymer chain or may be inserted into the backbone itself. If individual molecules are linked to the polymer chain, the molecules may be linked in an ordered fashion, say D-I-A-D-I-A, or in a random fashion, say D-I-D-D-A-I, etc.

For random dispersion of molecules or charge transfer system in a host matrix, there will be a minimum concentration necessary to obtain spatial light modulation.

One strategy for obtaining a large quantum yield for charge separation and a variable charge separated lifetime is to mimic the three-state system of photosynthesis, abbreviated D-I-A, where D is the donor molecule, I is the intermediate molecule and A is the acceptor. The actual charge transfer pathways may be arranged as shown in FIG. 1.

As shown in FIG. 1, the donor state is initially excited by light h$\nu$ (vertical arrow). Two sequential electron transfer reactions (solid arrows), denoted "1" and "2" then move charge from D to A faster than direct $D^+-I^-$ charge recombination can occur. The charge can only recombine by tunneling the full D-A distance (dashed arrow, reaction "3"). Thus, the increased distance for the recombination of D.-A. results in an increased persistence or hold time of the charge separation. The rates of all transfers are adjustable chemically, thus allowing one to achieve the desired hold time. This is the basic energy level scheme employed in many natural photosynthetic systems to achieve efficient charge separation.

The unique aspect of the strategy depicted in FIG. 1, and probably that which makes it so efficient in biological systems, is the fact that only direct $D^+-A^-$ recombination is possible under normal conditions, although the forward reaction proceeds through the intermediate state. Theoretical work has provided some important benchmarks for understanding how this situation may arise in photosynthesis and how it might be duplicated in synthetic systems; these ideas form the basis for the strategy schematized in FIG. 1.

Electron transfer rates decrease exponentially with donor-acceptor separation distance because the reaction involves quantum mechanical charge transfer. If the transfer rate is written as K $\alpha$ exp($-\alpha$R), with R the donor-acceptor separation, then the decay parameter o can be modulated by changing the electronic structure and dielectric properties of the host medium.

The strategies in FIG. 1 are designed to increase the spatial separation between electron and hole, thus slowing the recombination rate by a factor exponential in this extra distance. It is clear that the presence of an intermediate state greatly aids this spatial separation, and for randomly distributed reactants, the concentrations of the various species must be carefully chosen to take full advantage of this effect.

Electron transfer reactions exhibit a characteristic dependence on the free energy difference, or driving force ($\Delta G$) between initial and final states. This dependence, which is very strong at small $\Delta G$ and weaker at large $\Delta G$, results from an interplay of classical and quantum mechanical effects in the determination of the charge transfer rate.

It is desirable to make use of the $\Delta G$ dependence of the individual transfer rates to enhance the overall efficiency and hold times of CT-SLMs. The crossover from "small" to "large" $\Delta G$ occurs at roughly the classical reorganization energy $\lambda$ of the host medium, which is essentially the energy stored in the dielectric response of the medium to the charge separation. By arranging for the charge recombination $\Delta G$ to be much smaller than $\lambda$, the recombination rate is both very slow and easily tailorable through small energetic changes in the D and A states. These energetic changes can be accomplished through chemical substituent effects. Electron donors and acceptors of various strengths as indicated by electro-chemical redox potentials can be used to adjust $\Delta G$. The chemical nature (e.g., aliphatic or aromatic) of the host medium can affect the strength of the electronic coupling and the size of $\lambda$. Also, the molecular structure (e.g., conjugated vs. nonconjugated) of a covalent bridging group in linked donor/acceptor systems can affect the coupling and $\lambda$ in such systems.

B. EXAMPLES OF DONOR/ACCEPTOR SYSTEMS FOR CT-SLM DEVICES

Figure 1B:
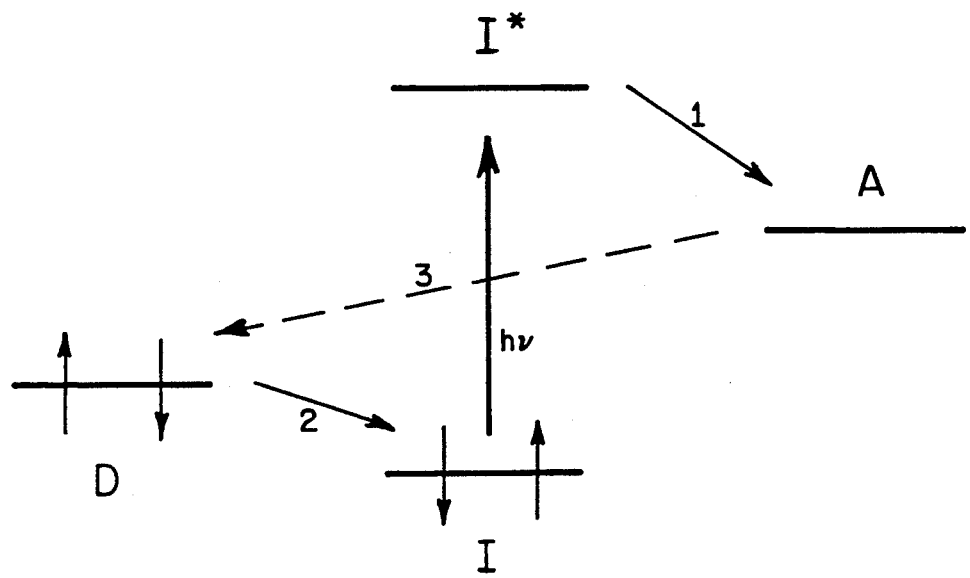
FIG. 1b is an energy level diagram, showing the strategy of using three states to separate charge following excitation of the intermediate state (I).

One well-studied donor-acceptor system in which the transfer induces a substantial spectral change is the ruthenium trisbipyridyl (I) - methyl viologen (A) system (see FIG. 1b). As in FIG. 1a, the reactions which lead to distant charge separation are denoted by solid arrows ("1" and "2") and the charge recombination by dashed arrow "3".

The acceptor is transparent in the visible region of the spectrum at wavelengths longer than 400 nm prior to transfer and is intensely colored following transfer due to absorption by the reduced species at 603 nm. It is also known that the "hole" on the $I^+$ can be filled by an electron from an aromatic amine (D). Hence, a three-state system may be constructed from these species in a suitable polymer. All needed materials are commercially available and the sample preparation of the SLM is relatively simple.

Fabrication of a CT-SLM can be accomplished by a variety of methods. These methods are commonly used in the preparation of dyed optical quality plastics. The general process is to dissolve the appropriate type and quantity of electron donor/acceptor system in a fluid medium and then form a plastic slab into an optical quality component. As an example, fabrication of an SLM slab involving randomly distributed donors and acceptors is described. A quantity of electron donor, (intermediate), and acceptor is dissolved in a fluid monomer such as methyl methacrylate. A small amount (say, about 1%) of a polymerization initiator (e.g., azobisisobutyronitrile) is also dissolved in the fluid monomer. The monomer solution is poured into an appropriate mold and the mold is uniformly heated to about 50° to 80° C. for several hours, or until the polymerization is complete. Those familiar with the casting of plastic components will recognize various modifications.

Alternatively, the donors and acceptors can be dissolved in a common solvent (e.g., dichloromethane) with the polymer itself. The polymer solution containing the donors and acceptors is poured into a cylindrical container and the solvent is allowed to evaporate slowly, leaving behind a doped plastic slab.

Other variations would include direct addition and dissolution of donors and acceptors in the molten state of the polymer, molding of the molten dyed polymer, and cooling to form a plastic slab, or the solvent-assisted diffusion of dopants into a preformed thin plastic sheet by exposure of such a sheet to a solvent (capable of swelling the plastic) solution containing the dopants.

Polymerization of the doped monomer and solvent casting of plastic slabs are the preferred methods due to the uniformity and relatively low temperature processing.

The quantities (concentrations) of the dopants used to fabricate the SLM are crucial to the optical performance of the device. The concentrations of the dopants in the plastic slab are chosen according to criteria for efficient absorption of the writing optical radiation, efficient electron transfer, and long hold times of the charge separated states. The concentration of the donor is chosen so that >90% of the writing beam is absorbed over the length of the slab. Thus, given the donor extinction coefficient $\epsilon_D$ for absorption of the writing beam wavelength and the slab thickness 1, one can calculate the required donor concentration $C_D$ from Beer's law:

$$ti A = -log\ T = \epsilon_D C_D l$$

so $$C_D = (-\log T)/(\epsilon_D l) = (-\log 0.1)/(\epsilon_D l)$$
$$= 1/(\epsilon_D l)$$

Assuming a donor extinction coefficient of $10^5 M^{-1} cm^{-1}$ and a pathlength of 0.1 cm gives a concentration of $10^{-4}$ M (where M is moles/liter).

An appropriate acceptor is chosen to optimize the thermodynamics for forward electron transfer. Thus, from the theory of electron transfer, the donor and acceptor are chosen such that $\Delta G_O \approx \lambda$ for the transfer process and medium reorganization energy.

To calculate the required acceptor concentration, one must know the quenching radius, which depends on the donor/acceptor pair, the excited donor lifetime, and the medium. Electron transfer theory gives an expression for the quenching radius as:

$$R_q = [ln(A \cdot \tau_D)]/\alpha$$

where A is a prefactor of the distance-dependent electron transfer rate, typically $\approx 10^{12}$ sec$^{-1}$, $\tau_D$ is the excited donor lifetime, and $\alpha$ is the exponential constant for the distance dependance of the rate, typically $\approx 1$ Ụ$^{-1}$.

Taking $\tau_D$ to be 100 nsec gives for $R_q$:

$$[ln(10^{12} \cdot 10^{-7})/1 = ln\ 10^5 = 11.5 Ụ$$

The typical range for $R_q$ is about 7 to 16 Ụ for various donor/acceptor combinations.

A quencher concentration is required such that there is a high probability that there is a quencher within a radius $R_q$. The probability of having a quencher within radius $R_q$ for a uniform, randomly distributed system is $$P = 1 - \exp(-(4/3)\pi R_q^3 \cdot N_q)$$

where $N_q$ is the number density of quenchers.

Rearranging and inserting the expression for $R_q$ gives $$N_q = \frac{-3 \ln(1-P)}{4\pi} \left(\frac{\alpha}{\ln(A\tau_D)}\right)^3$$

Taking $P = \frac{1}{2}$ gives
$$N_q = 0.165 \cdot (\alpha/\ln A\tau_D)^3$$

It will be recalled that the concentration $C_q = (1000 N_q)/N_A$, where $N_A = 6.023 \times 10^{23}$ (Avogadro's number). Using the parameters above ($R_q = 11.5$ Ụ) gives $N_q = 1.1 \times 10^{20}$ cm$^{-3}$ or $C_q = 0.18$ moles/liter. So for the range of quenching radii for various donors and acceptors, the quencher concentration will need to be at least about 0.1 moles/liter.

Examples of host matrix materials include glassy organic polymers such as polymethylmethacrylate (PMMA), polycarbonate (e.g., Lexan), polystyrene (PS), polyvinylalcohol (PVA), polyvinylcarbazole (PVCz), polybutylmethacrylate, polychlorostyrene, polyvinylacetate, and polyvinylnaphthalene and small molecule organic glasses in the fluid state or cooled below the glass transition temperature by, for example, cooling with liquid $N_2$ (77 K), such as diethylether/isopentane/ethanol (5:5:2) (EPA), n-pentylether/isopentane/alcohol 2-methyl tetrahydrofuran (2MTHF), sucrose octa-acetate (room temperature), methanol/ethanol (1:4), 3-methyl pentane, diethyl ether, n-pentane/n-heptane (1:1), ethanol, methyl cyclohexane/n-pentane (4:1), EPA/chloroform (12:1), and triethylamine/diethyl ether/n-pentane (2:5:5).

The donor, intermediate, and acceptor molecules, or chromophores, may be randomly dispersed in a host material; such dispersion is on a molecular level. Preparation of an SLM is effected by dissolving the host material and the chromophores in a solvent, then casting onto a flat surface, and allowing the solvent to evaporate. A random dispersion of molecules in the slab of the host is thereby achieved.

In another embodiment, the chromophores described earlier are dissolved in the monomeric precursor of the host polymer. Polymerization of the monomeric solution is then initiated. The chromophores are then embedded in the host polymer.

Mechanical dispersion of the chromophores may be achieved by conventional blending of powders of the chromophores and the host polymer and then melting or hot pressing to form the SLM of a desired shape.

In yet another embodiment, a sheet of the host polymer may be dipped in a solvent containing the chromophores, and the solvent is allowed to evaporate.

Another three-state system consists of porphyrins and quinones with the possible configurations shown in FIG. 2.

Figure 2A:
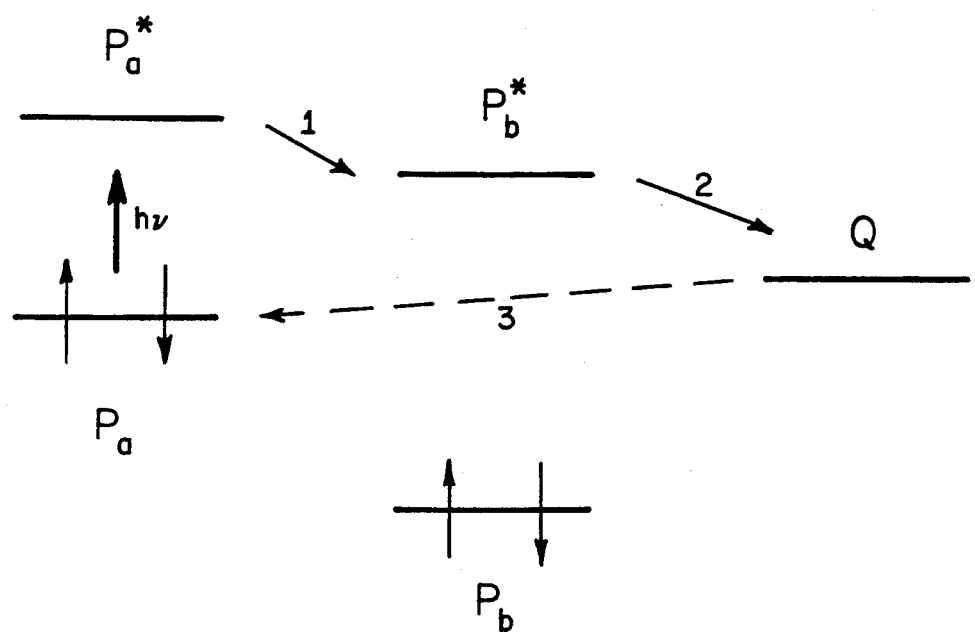
FIG. 2a is an energy level diagram depicting the charge separation and recombination pathways in a system consisting of two porphyrins (P) and one quinone (Q).

FIG. 2a depicts two different porphyrins (P), with porphyrin a acting as donor and porphyrin b acting as intermediate. A quinone (Q) is used as an acceptor. It is essential that the optical excitation for $P_a$ be smaller than that for $P_b$ to exclude the possibility of excitation quenching of the $P_a^*$ state.

Figure 2B:
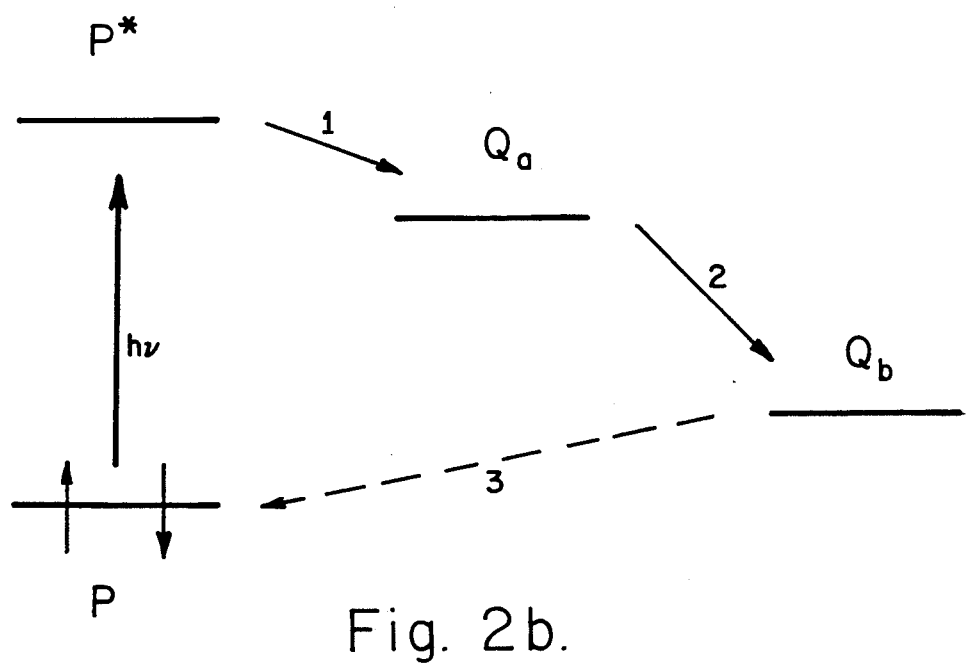
FIG. 2b is an energy level diagram similar to that of a system consisting of one porphyrin and two quinones.

FIG. 2b is analogous to that of FIG. 2a, except that the porphyrin acting as intermediate is replaced with a quinone, different than that used as the acceptor.

The energetics and excited state lifetimes of porphyrins are tailorable by varying the metal atom and ring substituents. The electronegativity value of the ring substituent is used to select candidate functional groups to achieve a desired effect. Such tailorability is within the capability of one skilled in the art, based on the teachings herein.

There are literally hundreds of donor, intermediate, and acceptor molecules which could be used to fabricate the CT-SLMs of the invention in any of the possible functional configurations. The fundamental requirement for electron transfer to be allowed between the species is that the thermodynamic driving force ($\Delta G$) be negative. The driving force can be reliably estimated from the redox potentials for the $D/D^+$, $A/A^-$ redox pairs. For transfer from an excited state, the redox potential can be estimated as the ground state redox potential corrected by the excitation energy. In the tables listed in the following references, many redox potentials are cited, along with excitation wavelengths: D. Rehm and A. Weller, Israel Journal of Chemistry, Vol. 8, pp.259-271 (1970), G. J. Kavarnos and N. J. Turro, Chemical Reviews, Vol. 86, pp. 401-449 (1986), and T. Guarr, M. E. McGuire, and G. McLendon, Journal of the American Chemical Society, Vol. 107, pp. 5104-5111 (1985).

While one can generally identify particular molecules as "donors" or "acceptors", this distinction may be ambiguous. For example, a particular species may be capable of oxidizing or reducing a given partner once it is promoted to an excited state. Also, in three-state schemes, the intermediate species may be a species chosen from the list of donors or acceptors. For example, an intermediate may be created by modifying a "donor" to make its LUMO (lowest unoccupied molecular orbital) slightly less reducing (energetic). Similarly, an acceptor can be modified to become an intermediate by making its LUMO slightly more reducing (energetic) than the acceptor LUMO. In other words, the relative energetics of the states involved in the CT-SLM define which is the donor, which is intermediate, and which is acceptor.

Listed below are typical donors (which are known to perform excited state electron transfer) and typical acceptors. It will be recalled that simple derivatives of these species will serve as intermediates.

It is possible to design CT-SLMs based on photoexcitable donors, acceptors, and intermediates.

Photoexcitable donor species: Examples include naphthalene, pyrene, and benzanthrene.

Photoexcitable acceptor species: Examples include benz(a)anthracene, pyrene-3-carboxylic acid, and 4-azaphenanthrene.

Examples of acceptors to quench photoexcited donor states include tetracyanoethylene, 1,4-dicyanobenzene, pyridine, 9,10-dicyanoanthracene, methyl benzoate, 1-cyanonaphthalene, and chloranil.

Examples of donors to quench photoexcited acceptor states include: N,N-dimethyl aniline and N,N,N,N,-tetra-methyl-p-phenylenediamine.

Examples which can be either donors or acceptors in the excited state include: Ru(bpy)$^{2+}$, Cr(bpy)$^{3+}$, where bpy is Zn(tetraphenylporphyrin), Pt$_2$(P$_2$O$_5$)H$_8^{4-}$, and Cr(CN)$_6^{3-}$.

A number of redox pairs useful in the practice of the invention are listed in D. Rehm and A. Weller, supra, G. J. Kavarnos and N. J. Turro, supra, and T. Guarr, M. E. McGuire, and G. McLendon, suora.

Also, a large range of quinones is commercially available with diverse redox properties. The charge-separated state is detected by characteristic porphyrin radical cation transient absorption spectra.

All of the systems described herein are known to be robust with respect to degradation under laser irradiation and repeated reduction/oxidation in the absence of oxygen.

Films can be prepared by spin coating of various substrates or by solution casting. Thicker plates can be prepared by in situ polymerization with the dopants present in the reaction mixture.

C. DEVICES CONFIGURATION

In its simplest realization, the SLM itself may comprise a plastic (or other host material) slab that contains electron donor and acceptor compounds molecularly dispersed internally or attached to the polymer chain, as described earlier. The slab may be of cylindrical or rectangular shape.

Various charge transfer system realizations include:

1. Donor, intermediate, and acceptor randomly dispersed in the host medium.

2. Donor, intermediate, and acceptor covalently linked together and dissolved or dispersed in the host medium.

3. Donor, intermediate, and acceptor attached to the host matrix.

4. Some combination of 1, 2, and/or 3.

As an all-optical spatial light modulator, the device requires no hard connection or wiring to the processing system, except for mechanical support. The writing of the spatial modulation in the slab is accomplished by using light (an image) tuned to the appropriate wavelength to initiate molecular electron transfer and achieve charge separation. The electron transfer between molecular species in the slab results in the formation of concentrations of oxidized donor molecules ($D^+$) and reduced acceptor molecules ($A^-$). The $D^+$ and $A^-$ species will have absorption spectra which generally differ substantially from the neutral forms. Thus, the induced optical spectral change can be used to modulate a read-out beam. The read-out wavelength is chosen to coincide with a wavelength where the induced change is large (or coincides with a convenient wavelength).

Figure 3:
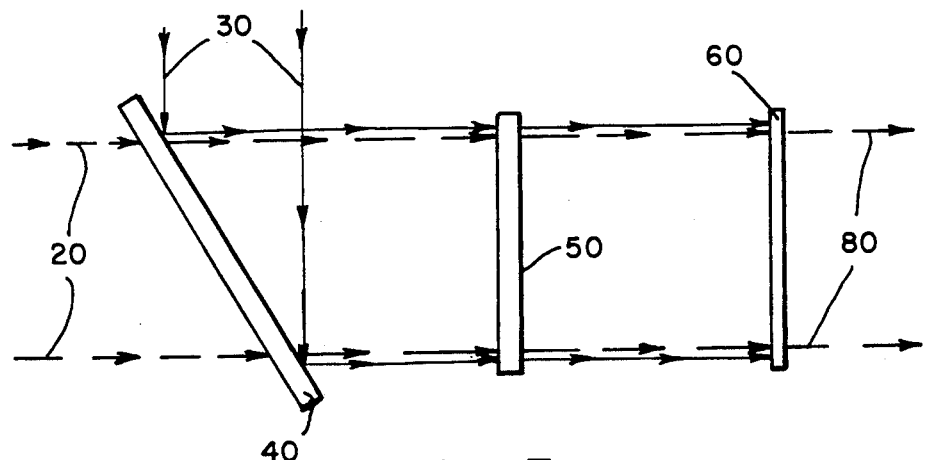
FIG. 3 is a schematic view of an example of a device configuration in accordance with the invention.

An example of one device configuration is depicted in FIG. 3. A read-in beam or image 20 of wavelength $\lambda_R$ is superimposed on a writing beam or image 30 of wavelength $\lambda_W$, such as by means of a dichroic mirror 40. The superimposed beams 20 and 30 pass through a spatial light modulator 50 and thence through a filter 60 which is tuned to block $\lambda_W$. The output beam is a modulated read-out beam or image 80 and is passed to an imaging detector or optical processor (not shown).

The above device configuration just shows a writing beam and a read-out beam which are at distinct wavelengths being combined by a dichroic mirror so they can pass through the SLM together and information can be transferred. The writing beam is blocked by a filter exposing the spatially modulated read-ut beam to the rear-end detectors or processors.

Figure 4:
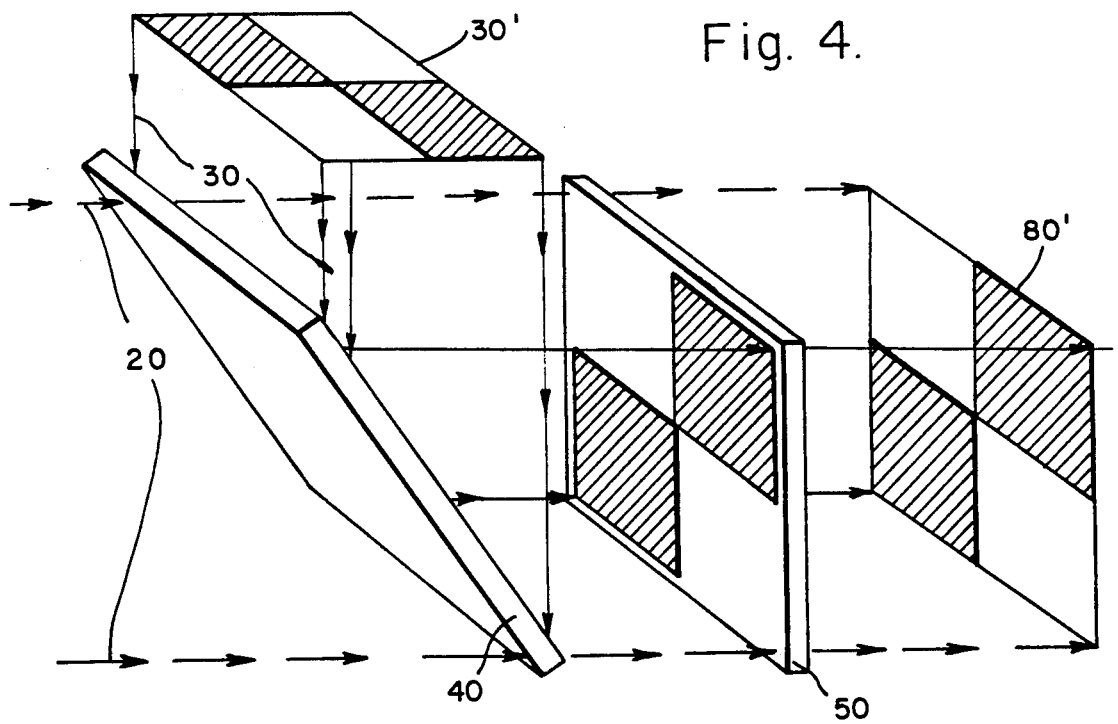
FIG. 4 is an schematic depiction of how information on a writing beam is transferred to a read-out beam.

An example of how information on the writing beam from an image 30' may be transferred (as complement) to the read-out beam for an all-optical SLM is depicted in FIG. 4. There, the writing beam 30 causes charge transfer, leading to increased absorption at the read-out beam wavelength. Thus, bright regions of the writing beam cause the modulator to become dark and transmit less of the read-out beam, as shown on the modulated image 80'.

Other implementations may be achieved, using the SLM of the invention, along with lenses, arrays of sources and detectors, and feedback thresholding and gain elements so as to achieve architecture to perform optical vector matrix multiplication, associative memory (optical neural network) and image correlation, for example.

The spatial resolution of the device is limited by diffraction of light to be on the order of a wavelength, $\lambda$. Assuming a $\lambda$ of 0.5 $\mu$m and a minimum acceptable line spacing of 2$\lambda$, then the maximum number of line pairs which can be written is 1000 lines/mm. Shorter wavelength writing beams can afford higher resolution.

The response speed of the device must be defined in terms of two time constants: the rise time for the induced transmission change $\tau_R$ and the decay time (hold or persist& ence time) $\tau_D$. These time constants are in principle adjustable over some range by modifying the donor/acceptor pairs or their effective coupling or their concentrations.

For some typical donors and acceptors based on organic or organometallic molecules, the rise times $\tau_R$ would correspond to the time required for charge separation and would typically be in the range of about $10^{-12}$ to $10^{-9}$ sec for strongly coupled pairs, but could be as long as about $10^{-6}$ sec for weakly coupled or multistep processes. The extent of coupling is determined by the nature of any linker groups used in linked systems. Coupling is also determined by the tunneling interaction between chromophores and the matrix. The hold times are somewhat more difficult to estimate, but are likely to be in the range of about $10^{-6}$ to $10^{-1}$ sec, with the faster end possibly down to $10^{-9}$ sec.

The sensitivity of such a device is estimated to be in the range of about 10 to 300 $\mu$J/cm$^3$. This is the optical energy required to write a detectable (1%) change in transmission in an SLM based on molecular charge transfer.

E. SUMMARY

Charge transport reactions are useful for creating transient programmable masks (CT-SLMs) in systems randomly doped with appropriate concentrations of donors, intermediates, and acceptors.

One can also develop a number of related electro-optical devices based on the molecular charge transport technology which are based on the teachings herein. One such device might employ transparent electrodes sandwiched around the materials described in this proposal. One could then initiate charge transport between two nearly degenerate levels by applying a static field and changing the ordering of the electronic energy levels with a Stark shift. Another strategy might employ a conducting polymer matrix for the donors and acceptors and transparent electrodes on the surfaces of the device. In this case, actual electrochemical reduction/oxidation of the species in the film could be used as the switching event.

Thus, an all-optical photochromic spatial light modulator based on photoinduced electron transfer in rigid matrices has been described. It will be apparent to those skilled in this art that various changes and modifications may be made without departing from the spirit scope of the invention, and all such changes and modifications are deemed to fall within the ambit of the invention, as defined by the appended claims.

We claim:

1. An all-optical, two-dimensional spatial light modulator adapted to switch transmissive properties for a certain amount of time at specific locations comprising:
   (a) a multi-state intermolecular charge transfer system capable of switching electrons between states;
   (b) optical means for supplying input data to said charge transfer system; and
   (c) optical means for supplying an input electromagnetic wave which induces electron transfer in said charge transfer system to provide an output electromagnetic wave, the intensity of said output electromagnetic wave being spatially modulated by said input data.

2. The spatial light modulator of claim 1 wherein said multi-state intermolecular charge transfer system comprises a first molecule capable of donating a charge and a last molecule capable of accepting a charge.

3. The spatial light modulator of claim 2 wherein said first and last molecules form a charge transfer system.

4. A spatial light modulator of claim 2 wherein said first and last molecules operatively associated with at least one intermediate molecule.

5. The spatial light modulator of claim 4 wherein said first, last and said at least one intermediate molecule form a charge transfer system.

6. The spatial light modulator of claim 4 wherein said donor moiety comprises an aromatic amine, said intermediate moiety comprises ruthenium trisbipyridyl, and said acceptor moiety comprises methyl viologen.

7. The spatial light modulator of claim 4 wherein said donor moiety comprises a first porphyrin, said intermediate moiety comprises a second porphyrin, and said acceptor moiety comprises a quinone.

8. The spatial light modulator of claim 4 wherein said donor moiety comprises a porphyrin, said intermediate moiety comprises a first quinone, and said acceptor moiety comprises a second quinone.

9. The spatial light modulator of claim 1 wherein said multi-state intermolecular charge transfer system is randomly distributed in a host medium.

10. An all-optical, two-dimensional spatial light modulator adapted to switch transmissive properties for a certain amount of time at specific locations comprising:
    (a) a three-state intermolecular charge transfer system capable of switching electrons between states, said system randomly distributed in a host medium;
    (b) optical means for supplying input data to said charge transfer system; and
    (c) optical means for supplying an input electromagnetic wave which induces electron transfer in said charge transfer system to provide an output electromagnetic wave, the intensity of said output electromagnetic wave being spatially modulated by said input data.

11. The spatial light modulator of claim 10 wherein said three-state intermolecular charge transfer system comprises a first molecule capable of donating a charge and a last molecule capable of accepting a charge and at least one intermediate molecule operatively associated therewith.

12. The spatial light modulator of claim 11 wherein said first, last and said at least one intermediate molecule form a charge transfer system.

13. The spatial light modulator of claim 11 wherein said donor moiety comprises an aromatic amine, said intermediate moiety comprises ruthenium trisbipyridyl, and said acceptor moiety comprises methyl viologen.

14. The spatial light modulator of claim 11 wherein said donor moiety comprises a first porphyrin, said intermediate moiety comprises a second porphyrin, and said acceptor moiety comprises a quinone.

15. The spatial light modulator of claim 11 wherein said donor moity comprises a porphyrin, said intermediate moiety comprises a first quinone, and said acceptor moiety comprises a second quinone.

16. The spatial light modulator of claim 11 wherein each donor, intermediate, and acceptor molecule is randomly dispersed in said host.

17. The spatial light modulator of claim 11 wherein said host comprises a polymer and wherein said donor, intermediate, and acceptor molecules arelinked to the backbone thereof.

18. The spatial light modulator of claim 11 wherein said donor, intermediate, and acceptor molecules are covalently linked to form a charge transfer system.

19. The spatial light modulator of claim 18 wherein said molecular module is randomly dispersed in said host.

20. The spatial light modulator of claim 18 wherein said host comprises a polymer and wherein said molecular module is linked to the backbone thereof.

* * * * *